United States Patent
Berger et al.

(10) Patent No.: US 6,707,646 B2
(45) Date of Patent: Mar. 16, 2004

(54) METHOD AND APPARATUS FOR DYNAMICALLY CONTROLLING THE FLYING BEHAVIOR AND HEIGHT OF A READ/WRITE HEAD IN A STORAGE DEVICE BY MANIPULATING THE SPRING CONSTANT OF THE SUSPENSION

(75) Inventors: Ruediger Friedrich Berger, Heidesheim (DE); Andreas Dietzel, Wallertheim (DE); Friedrich Fleischmann, Erlangen (DE)

(73) Assignee: Hitachi Global Storage Technologies Netherlands B.V. (NL)

(*) Notice: Subject to any disclaimer, the term of this patent is extended or adjusted under 35 U.S.C. 154(b) by 182 days.

(21) Appl. No.: 09/920,475

(22) Filed: Aug. 1, 2001

(65) Prior Publication Data

US 2002/0024774 A1 Feb. 28, 2002

(30) Foreign Application Priority Data

Aug. 29, 2000 (DE) .......................... 001 18 660

(51) Int. Cl.⁷ ................................. G11B 5/56
(52) U.S. Cl. .................................. 360/294.7
(58) Field of Search ........................ 360/294.7

(56) References Cited

U.S. PATENT DOCUMENTS

| | | | | |
|---|---|---|---|---|
| 3,706,861 A | * | 12/1972 | Giel | ............ 360/294.7 |
| 5,477,404 A | * | 12/1995 | Kozaki | ............ 360/294.7 |
| 5,825,590 A | | 10/1998 | Ohwe | |
| 6,297,937 B1 | * | 10/2001 | Schar | ............ 360/294.7 |
| 6,307,719 B1 | * | 10/2001 | Mallary | ............ 360/294.7 |
| 6,359,759 B1 | * | 3/2002 | Congdon | ............ 360/294.7 |
| 6,437,948 B1 | * | 8/2002 | Sugimoto | ............ 360/294.7 |
| 6,501,625 B1 | * | 12/2002 | Boismier | ............ 360/294.7 |

FOREIGN PATENT DOCUMENTS

| | | |
|---|---|---|
| EP | 0 425 916 A2 | 5/1991 |
| EP | 0 605 343 A1 | 6/1994 |
| EP | 0 886 264 A1 | 12/1998 |
| JP | 5189906 A2 | 7/1993 |
| JP | 6084221 A2 | 3/1994 |
| JP | 08030947 A2 | 2/1996 |
| WO | WO 98/27547 | 6/1998 |

* cited by examiner

Primary Examiner—A. J. Heinz
(74) Attorney, Agent, or Firm—Robert B. Martin; Bracewell & Patterson, L.L.P.

(57) ABSTRACT

A suspension arm (300) of a disk storage device has an elastic portion (310) with thickness $d_1$ and a rigid portion (320) with thickness $d_2$. At the free end of the suspension arm, a slider (325) is mounted on the suspension arm. The bottom surface of the slider has a distance FH to a top surface of a hard disk (329). The suspension arm particularly comprises a heating element (330) disposed on the suspension arm. An electric current $I_c$ flowing through electrical supply wires (350) causes the temperature of the suspension arm locally to rise and therefore its spring constant to decrease. Together with the force $F_a$ resulting from the air cushion effect of the slider a new equilibrium flying height FH is stabilized.

12 Claims, 6 Drawing Sheets

Example 1
Positive Twist

Example 2
Negavtive Twist

METHOD AND APPARATUS FOR DYNAMICALLY CONTROLLING THE FLYING BEHAVIOR AND HEIGHT OF A READ/WRITE HEAD IN A STORAGE DEVICE BY MANIPULATING THE SPRING CONSTANT OF THE SUSPENSION

BACKGROUND OF THE INVENTION

1. Technical Field

This invention generally relates to rigid or hard disk drives or tape recording devices which store information or data on rotating or moving storage media. More specifically, the invention relates to a method and apparatus for dynamically controlling the flying behavior of a read/write magnetic head as a rotating magnetic disk spins under the head or as a moving magnetic tape moves under the head.

2. Description of the Related Art

Magnetic disk storage devices known in the prior art comprise an air-bearing slider. The slider itself is mounted on a so-called suspension arm which essentially functions as a load beam and which comprises a rigid portion and an elastic portion, wherein the elastic portion generates a load for urging the slider towards or away of the recording medium, so that the slider on which an electromagnetic transducer is mounted is pushed to the recording medium or pulled away from the recording medium with a certain necessary load.

For example, when a recording medium such as a magnetic recording disk is rotating, the load exerted on the slider is balanced by the airflow of an air cushion force exerted on the air bearing surface of the slider. As a result, the slider flies above the recording medium with a very fine gap, the so-called "flying height."

The flying height of a slider carrying a magnetic read/write head above a rotating magnetic hard disk lies currently in the range of 20 nanometers and will likely decrease in the future. In currently known hard disk devices the flying height is substantially determined by the particular design of an air bearing surface of the slider and a head gimbal assembly. But thereupon variations of the flying height within a few nanometers may exist for non-identical devices of the same type owing to fabrication tolerances. These tolerances considerably influence the writing and reading characteristics to and from the hard disk.

Two different groups of types of prior art magnetic head suspension mechanisms are known. In a first group, a thin film formed on the elastic portion of the suspension arm which is expandable or shrinkable due to an internal stress of the film itself causes the elastic portion and thereby the arm to bend thus varying the flying height of the read/write head above the disk surface. However, the bending of the suspension arm towards the disk surface increases the spring force pushing against the aerodynamic lift of the slider.

Transducers for bending the suspension arm, piezoelectric films, or bi-metallic strips have been proposed in the art. Approaches belonging to the first mentioned group are disclosed for instance in U.S. Pat. No. 5,825,590, "Magnetic Head Suspension Mechanism with a Thin Film Thereon For Creating a Bent Portion of a Vibration Absorbing Portion," assigned to Fujitsu Ltd., Japan and in U.S. Pat. No. 5,377,058, "Fly Height Servo Control of Read/Write Head Suspension" assigned to IBM Corporation, New York.

Another group of prior art approaches provides for a one-time and static adjustment of the spring pressure and/or the shape of the bending of the suspension arm. In Japanese Abstract JP 5189906 A, during production of floating type magnetic heads, it is therein proposed to set the floating amount of a slider at a small and exact amount by transferring heat energy to the spring part of the suspension arm and adjusting the spring pressure. Applying the heat is particularly accomplished by irradiating the spring with a laser beam and setting the bending amount in the rolling direction of the spring part by a discrete spring pressure regulation. After having set the bending amount the slider is mounted on the suspension arm.

According to another static approach disclosed in Japanese Abstract JP 63281283 A, the spring part is made of a superelastic material such as a shape-memory alloy which allows that the initial form of the spring part is rather a bent shape. The initial form is deformed until it is approximately parallel to the disk surface. Since only the spring part is made of the super elastic material, an in-plane rigidity is ensured and in addition the spring constant is minimized.

The above approaches using a transducer element have the drawback that such an element requires larger areas on the suspension what, for instance, complicates further miniaturization of the suspension arm.

SUMMARY OF THE INVENTION

The concept underlying the present invention is to influence or to vary the spring constant of a suspension and therefore to influence the equilibrium state of the prementioned two opposite forces, one resulting from the aircushion underneath the air-bearing surface of the slider thus causing a lift or sink force and the other force provided by the spring force of the suspension itself. By disturbing this equilibrium state of forces, the flying height of the read/write head can be changed in a controlled manner. By a controlled variation of the spring constant, the flying height therefore can be adjusted very precisely.

In contrast to the prior art approaches described above, the present invention provides for a passive as well as a active mechanism where actuation of the read-/write head is accomplished only by varying the spring constant k, and not by active deflection DX as in the prior art approaches, F=k–DX. In contrast to the prior art approaches, where the suspension is deflected actively by providing a bending force or bending momentum, according to the present invention the suspension, moreover, is being bent merely as a consequence of the new equilibrium of the mechanical forces acting upon the slider. In addition or alternative to the bending, the suspension can also be bent locally or even buckled by locally varying the spring constant give by the elastic modulus of the suspension material, respectively.

This invention therefore enables adjusting of an incorrect gramload or varying gramload only by (actively) adapting the spring constant appropriately. This can be accomplished already during the manufacturing process for the disk storage device after the suspension together with the read/write head have been assembled to the storage device or it can be accomplished during HDD operation as an active adjustment tool.

In addition, the proposed actuation scheme can also be implemented in a very small area on the suspension thus, for instance, enabling further miniaturization of the suspension arm.

For measuring the flying height of the head, there exist a number of methods and systems e.g. a thermal proximity sensing technique used in scanning probe microscopy sensors and exemplarily disclosed in U.S. Pat. No. 5,527,110 (Abraham et al.) entitled, "Method and Apparatus for Detecting Asperities on Magnetic Disks using Thermal Proximity Imaging". As the spinning velocity of the hard disk is nearly constant during operation of the disk storage device, the lift or sink forces are nearly constant too for a given design of the slider, in particular its shape of the air-bearing surface, thus allowing a one-time adjustment of an incorrect gramload. In addition, a particular flying height can be set during the manufacturing process.

Besides a static adjustment of the spring force by way of varying the spring constant, also an active or dynamic flying height adjustment can be accomplished to guarantee a good read and write characteristic and particularly the operation characteristic of the underlying spinning storage system.

Thereupon, through the high-speed spinning of the disk, the entire disk storage device will normally change its temperature during operation. This does also raise the temperature of the suspension arm and the air temperature inside a disk storage housing. Different temperatures of the suspension arm particularly cause changes of the spring force and thus corresponding changes of the flying height of the head. Variations of the air pressure or contamination of the air bearing surface have an impact on the air streaming underneath the slider and thus influence the lift force actuating on the slider. All these effects influencing the flying height can be dynamically adjusted by the present invention. Thereupon, variations in the speed of rotation of the hard disk and its influence on the flying height of the read/write head can be adjusted accordingly, for example in a low and high performance mode of the HDD.

Further environmental properties can be the degradation of materials over the time of operation of the hard disk which therefore has to be corrected to keep the optimum flying height in order to achieve reliability of the hard disk.

The invention also allows for dynamically setting a particular flying height so that the read/write head can be kept at a minimum flying height only during the read/write head is reading or writing to the magnetic disk. When there is no reading or writing access, which is about 90% of the hard disk spinning time, the read/write head can be withdrawn from the minimum flying height in order to enhance mechanical robustness of the hard disk. Thus, the invention enables dynamic two- or more-level operation of the read/write head.

Another technical field for advantageously applying the invention is future read and write processes which might need for both a different but defined flying height in order to achieve an ideal performance such as the storage density. For example, it might be more convenient to write magnetic bits at very small flying height while reading of bits is still possible at a higher flying height. In particular during the seek the servo pattern can be read with sufficient resolution at higher flying height. This would result in a decreased seek time. By actively controlling the flying height this could be realized and would also increase the life-time of the hard disk.

Changing the flying height thereupon enables to position the read/write head in a kind of parking position, where it is protected from damage thus being shock resistive. Additionally, when the slider is far away from the disk surface, the air friction force between the slider and the disk surface decreases and thus decreases, as a consequence, the power consumption which is needed to spin the hard disk.

Still another advantageous application field of the invention is use of disk storage devices in portable devices like laptops, mobile telephones or the like, where it might be useful to reduce power consumption by reducing the spinning velocity of the hard disk. Reducing the velocity of rotation of the disk may have an effect on the air-bearing forces and therefore might result in a variation of the flying height thus changing the performance of the device.

The variable suspension spring constant, in a first embodiment, is realized by varying locally the material temperature of the suspension arm. Such a temperature variation can be realized by a small heater deposited onto the suspension arm, for instance a thin or thick film structure deposited on the surface of the suspension arm. Varying the elastic properties of such a layer, which especially can change the spring constant in dependence of temperature, causes a variation of the bending of the suspension arm and therefore a variation of the flying height of the read/write head.

According to another embodiment, the variation of elastic properties can also be realized by using a bulk material or layer for the suspension arm or an according additional layer with a magnetoelastic effect where the spring constant of the material depends on the magnetization. The magnetization can be controlled by an external as well as by an internal applied magnetic field acting upon the magnetosensitive layer. An internal magnetic field source can be realized by a second e.g. hard magnetic layer deposited beneath or on top or close to the magnetosensitive material or by adding a small loop as inductive element to generate a magnetic field. Such a magnetic layer can be also used to bias or linearize the effect. Using a magnetoelastic layer or material has the advantage that there is not needed a continuous power consumption in the storage device since the magnetoelastic effect is a quasi-static effect.

It is noteworthy that the described concepts can be carried out individually for each slider/hard disk combination and do not depend on the peculiarities of the underlying disk storage device. Beyond that the concepts are not limited to magnetic hard disk storage devices and can also advantageously be applied to other present and future spinning disks based storage devices like optical disks etc.

Accordingly, it is an object of the invention to provide a method and apparatus for controlling the flying height of a read/write head above a moving storage medium, like a rotating magnetic hard disk or a tape of a tape recording device, which allow for an active and/or dynamic flying height adjustment or, particularly in case of a tape recording device, adjustment of the bearing pressure of its read/write head.

It is another object to provide a method and apparatus to allow for precisely setting the flying height of individual storage devices, in particular hard disk drives, at a defined value in order to meet fabrication tolerances.

It is another object to provide a method and apparatus which allow to compensate pressure changes in a hard disk drive and/or contamination of an air bearing surface in a hard disk drive or a tape storage device.

It is yet another object of the invention to provide a method and apparatus for controlling roll, pitch and twist of a read/write head above a rotating magnetic hard disk or above a moving tape of a tape store which allow for an active alignment or adjustment of these properties.

BRIEF DESCRIPTION OF THE DRAWINGS

The present invention will now be described in more detail by way of embodiments and making reference to the accompanying drawings.

DETAILED DESCRIPTION OF THE PREFERRED EMBODIMENT

Figure 1:
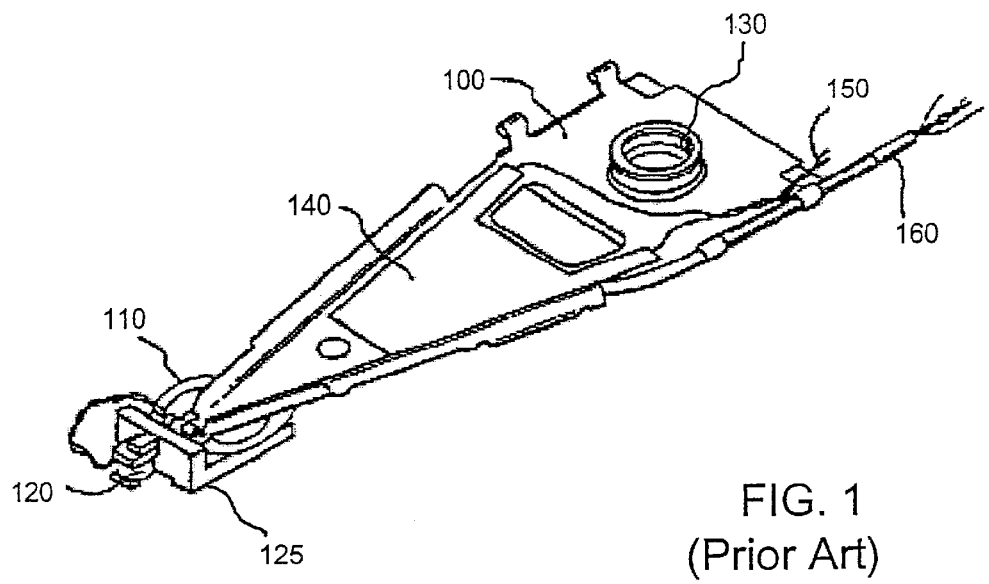
FIG. 1 is a perspective view of a suspension arm according to the prior art.

In FIG. 1, there is shown a suspension arm 100 which is disclosed in U.S. Pat. No. 5,377,058 and which comprises a floating suspension 110 and a read/write head 120 according to the prior art. The read/write head 120 is mounted on a slider 125. Electrical supply of the head 120 including one or more signal lines is accomplished via electrical wires 160. On its opposite side, the suspension arm 100 is mounted on an engine flange of a hard disk drive (not shown here) by means of a mounting flange 130.

A piezoelectric film 140 is bonded to the suspension arm 100. A flying height correction voltage is applied to the film 140 through electrical wires 150. Applying the correction voltage, the film 140 expands in the plain of the suspension arm 100 and due to the adhesion between the film 140 and the suspension arm 100 introduces a bending force to the arm 100 which forces the arm 100 to bend along its longitudinal axis and its lateral axis.

The bending of the suspension arm 100 towards a (not shown) disk surface increases the spring force pushing against the aerodynamic lift acting upon the read/write head 120 or the slider 125, respectively, so that the head 120 flies closer to the disk surface. Thus the flying height is adjusted by the correction voltage.

Figure 2:
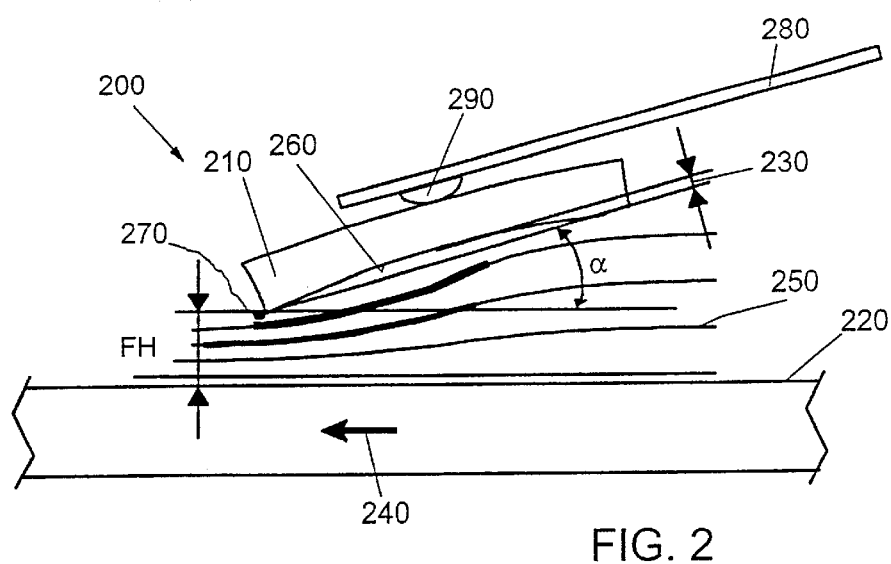
FIG. 2 is a schematic view of a suspension arm for illustrating the air cushion mechanism underlying the present invention.

FIG. 2 is a schematic side view of a suspension arm with a slider sliding above a disk surface of a magnetic hard disk. While the magnetic hard disk is rotating, an air cushion disposed under the slider exerts a force away or towards the hard disk. In equilibrium of the force $F_a$ and the spring force $F_s$, the head is flying above the rotating hard disk at a balanced flying height (FH).

According to the invention, the suspension arm comprises a material or alternatively a layer deposited on the surface of the suspension arm, where the spring constant strongly varies with a physical property of the material like its temperature or a magnetic flux through it or an applied electrical voltage. The spring force $F_s$, in a first approximation, can be written as $F_s = k \times l$, where k is the spring constant of the material and l is the longitudinal or lateral deflection of the suspension arm. According to the invention, the spring force F is varied by changing the spring constant k. A variation Dk hereby causes a variation of the deflection Dl with F=const. in a first approximation.

Referring now to FIG. 2, a view depicting a head slider assembly 200 particularly comprising a slider 210 located at a distance to a hard disk surface 220 is shown in order to illustrate the air cushion concept underlying the present invention. The flying height (FH) in the following will be defined as the minimum distance between the slider and the disk surface 220. The spatial orientation and the bending shape of the slider 210 relative to the disk surface can be characterized by the pitch angle a and the crown value 230. Due to the relative movement between the disk surface 220 and the slider 210, determined by the spinning direction of the hard disk depicted by arrow 240, a specific air stream 250 is formed which, according to the pitch a, results in a force due to the aircushion at the air bearing surface 260 comprising the minimum distance FH to the disk surface 220.

The flying height (FH) of the slider 210 or the head, respectively, is totally determined by the aforedescribed flying characteristics, i.e. the lift and sink forces produced by the slider aerodynamics, and the spring force with which the suspension arm 280 pushes the slider 210 to the disk surface 260.

Figure 3A:
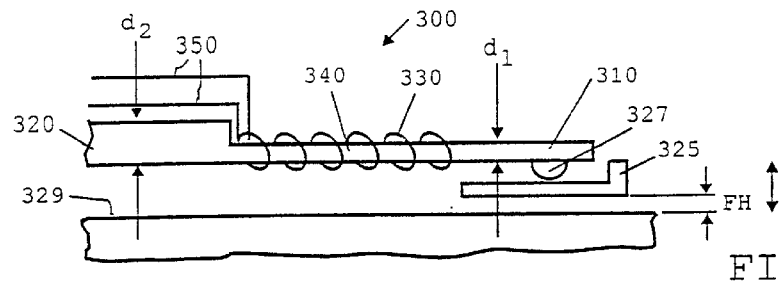
FIGS. 3a–3d are schematic views of different embodiments of the present invention.
Figure 3B:
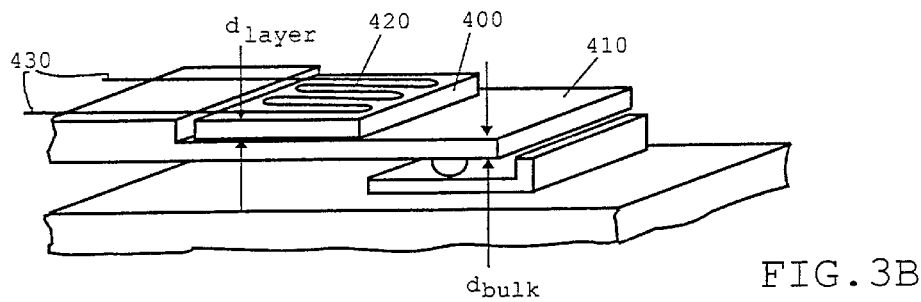
Figure 3C:
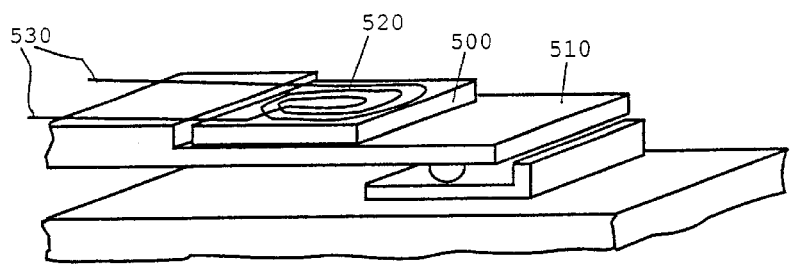

The following FIGS. 3a–3c depict different embodiments of a suspension arm according to the invention.

Now referring to FIG. 3a, a first embodiment comprises a suspension arm 300 including a or consisting of a bulk material with a spring constant with a relatively large gradient of the elastic modulus DE versus DT, where DT is the bulk temperature of the suspension arm 300. The suspension arm 300 is comprised of an elastic portion 310 with a thickness $d_1$ and a rigid portion 320 with a thickness $d_2$. At the free end of the suspension arm 300, a slider 325 is mounted on the suspension arm 300, 310 by means of a glue 327. The bottom surface of the slider 325 has a distance FH to a top surface of a hard disk 329.

The suspension arm 300 particularly comprises a heating element 330 disposed at a particular elasto-sensitive portion 340 of the bulk material which is highlighted by cross lines and which comprises an elevated gradient of the elastic modulus.

The heating element 330, in the present embodiment, is implemented as a resistance wire being wound around the suspension arm. Alternatively, the heating element 330 can be realized as a thin or a thick layer of an electric resistance material deposited onto one or both surfaces along the portion 340. An electric current $I_c$ flowing through electrical supply wires 350 causes the temperature of the elasto-sensitive material 340 to rise and therefore the spring constant of the material 340 to decrease.

Together with a constant force $F_a$ resulting from the air cushion effect underneath the slider 325 (see FIG. 2), the bending curvature of the suspension arm 300 will also decrease thus increasing the flying height FH of the slider 325 above the disk surface 329.

Another embodiment of the invention depicted in FIG. 3b comprises, instead of a bulk material, an elasto-sensitive layer 400 deposited on a suspension arm 410 and comprising a thickness $d_{layer}$. Depending on the difference between the thicknesses $d_{layer}$ and $d_{bulk}$, a change of the spring constant of the layer 400 will also cause a change in the bending curvature of the suspension arm 410.

This embodiment also comprises a heating element 420 which, in the present embodiment, is implemented as a meander-shaped resistance wire 420. An electrical current supplied by supply wires 430 and flowing through the resistance wire 420 causes heating primarily of the layer 400 and thus causes a change of the spring constant of the layer 400, accordingly. This will also cause a change in the bending curvature of the suspension arm 410 due to the so-called "passive bimetallic effect," i.e. the decrease of the bending momentum of the layer 400 acting upon the suspension arm 410. In this arrangement, the actuation owing to the bimetallic effect and the elastic effect may have opposite signs. Materials can be chosen which show a zero actuation by varying the temperature. Alternatively, materials with a high elastic effect can be chosen which overcompensate the bimetallic actuation.

It is emphasized hereby that the direction of change of the bending curve and thus the flying height depends on the sign of the internal stress of the two-layer system and thus can be an increase or decrease of the flying height when raising the temperature.

FIG. 3c shows an embodiment where a layer 500 of a magnetoelastic material is deposited on a suspension arm 510. A change of the elastic modulus of the layer 500 is induced by means of a magnetic field which is generated by means of a wire wound in the form of a flat coil on top of the layer 500 or around the suspension. The coil wire 520 is supplied via supply wires 530.

Figure 3D:
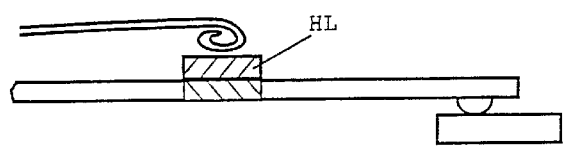

FIG. 3d shows an embodiment where a hard magnetic layer (HL) is placed on top or very close or on the close proximity to a magnetoelastic portion of the suspension. The magnetization of the hard magnetic layer defines the direction of magnetization of the magnetoelastic portion of the suspension, and therefore its elastic properties. The magnetization of HL can be switched by an externally applied field, even a field applied outside the HDD, or set by a short current pulse through a small inductive element disposed on top of the HL. After the external applied field or the current pulse, the magnetization in the HL rotates in a desired direction and therefore defines the elastic properties of 500. The embodiment can be designed by only using a magnetoelastic portion which, in itself, is a hard magnetic material.

Figure 4A:
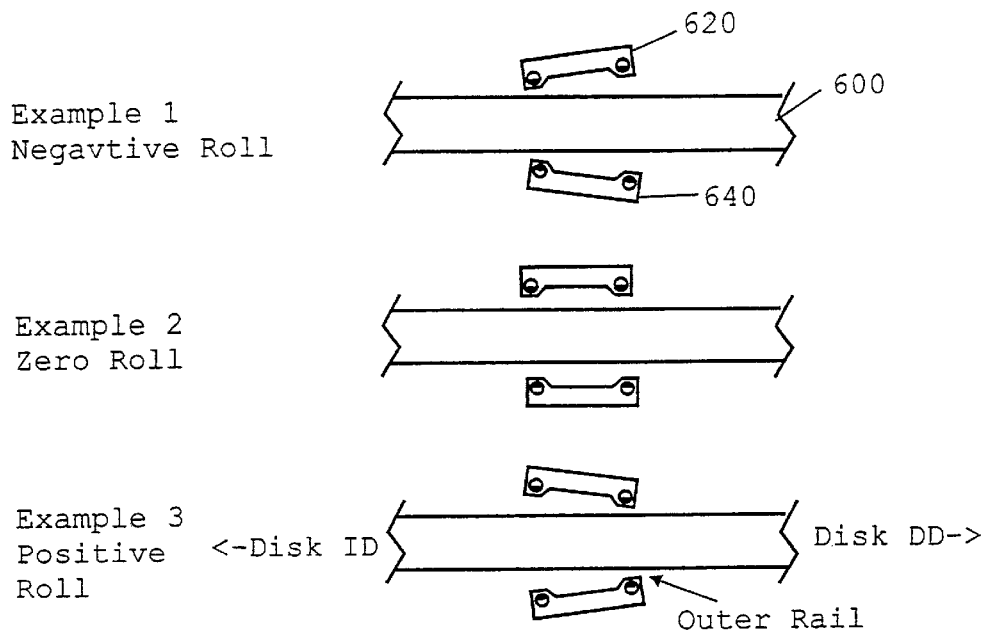
FIGS. 4a–4c are schematic views to illustrate definition of roll, pitch and twist.

FIG. 4a is a schematic view along longitudinal axis to the rear of a top slider 620 and a bottom slider 640 sliding above a disk surface of a magnetic hard disk 600. While the magnetic hard disk is rotating, an air cushion disposed under the slider exerts a force away or towards the hard disk. As sketched, sliders 620, 640 may be parallel (zero roll) or angled with respect to the disk surface.

Figure 4B:
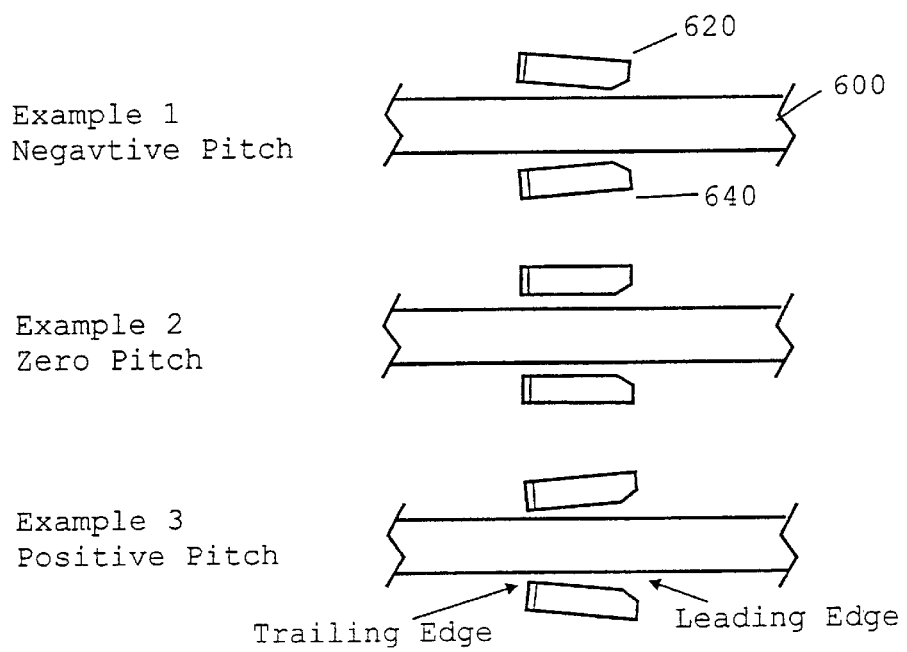

FIG. 4b is a schematic side view of a top slider 620 and a bottom slider 640 sliding above a disk surface of a magnetic hard disk 600. While the magnetic hard disk is rotating, an air cushion disposed under the slider exerts a force away or towards the hard disk. As sketched, the ABS of sliders 620, 640 may be parallel (0 pitch) or angled with respect to the disk surface.

Figure 4C:
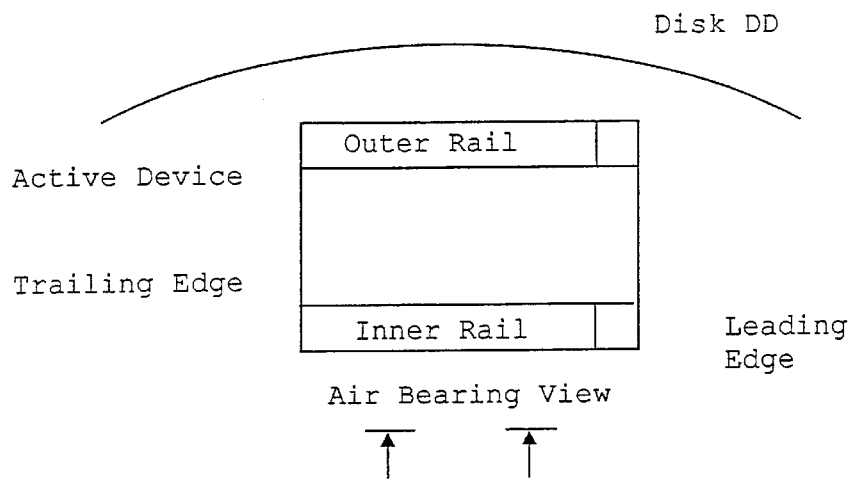
Figure 4C:
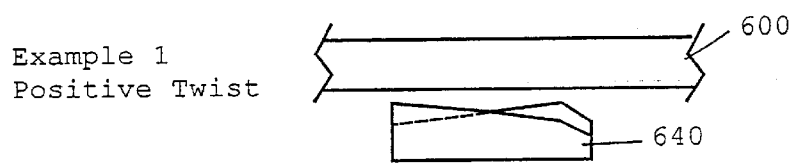
Figure 4C:
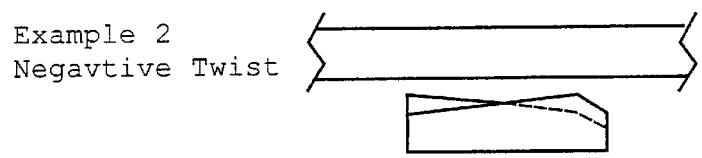

FIG. 4c is a schematic side view of a bottom slider 640 sliding above a disk surface of a magnetic hard disk 600. As sketched, the slider may be twisted along longitudinal axis.

Figure 5A:
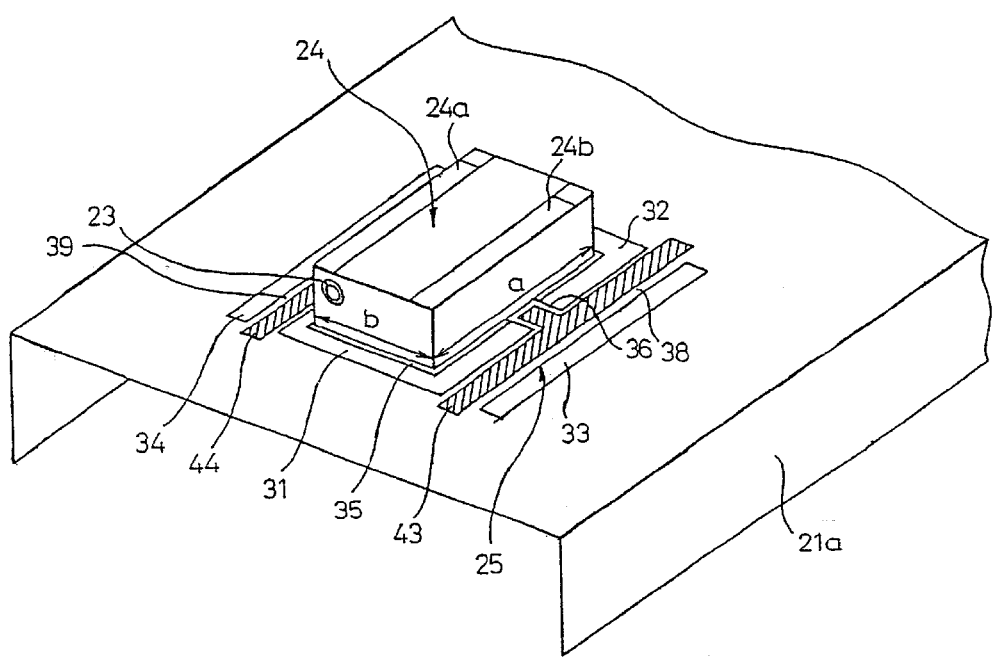
FIGS. 5a–5d are schematic views of different embodiments of the present invention.

In FIG. 5a from German patent application DE 19603192 A1, FIG. 6, a front part of a suspension arm 21a with slider 24 is depicted. The suspension arm is modified by U-shaped slits 31 and 32 near the slider 24 and straight slits 33 and 34. This way, a H-like head mounting region is formed, with bridges 36, 38, and 39 forming a kardanic-like suspension system. This suspension system suffers from being non-ideal kardanic. Forces required to bend or twist the bridges prevent the head to align the slider correctly to the disk surface by means of air cushion pressure only, if slider was mounted non ideal.

Figure 5B:
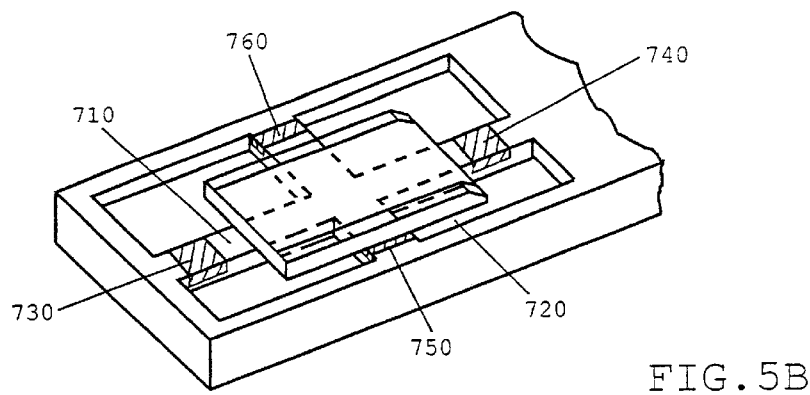

FIG. 5b shows a modification of the system of FIG. 5a with bridges 710 and 720 or parts of the bridges 730,740, 750,760 comprised by a material or alternatively a layer deposited on the surface of the bridge, where the spring constant strongly varies with a physical property of the material like its temperature or a magnetic flux through it as already described for the suspension arm. By selectively changing the spring constant of bridges, mounting tolerances of the slider can be corrected to adjust roll, pitch or twist.

Figure 5C:
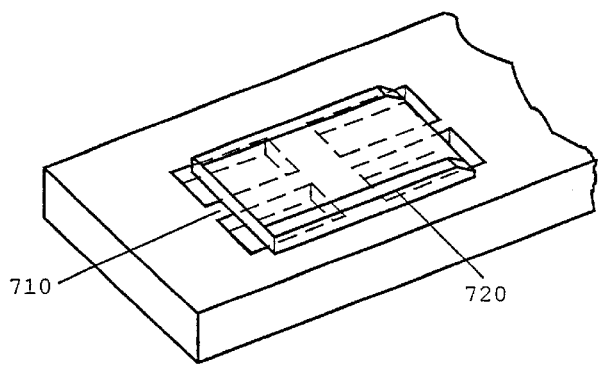

FIG. 5c shows a different embodiment of the invention using another kardanic like suspension system, comprised from crossed bridges 710 and 720. Systems depicted in FIGS. 5a to 5c, suffer from bridges coupled to each other. Thus an individual adaption of roll and pitch can not be maintained.

Figure 5D:
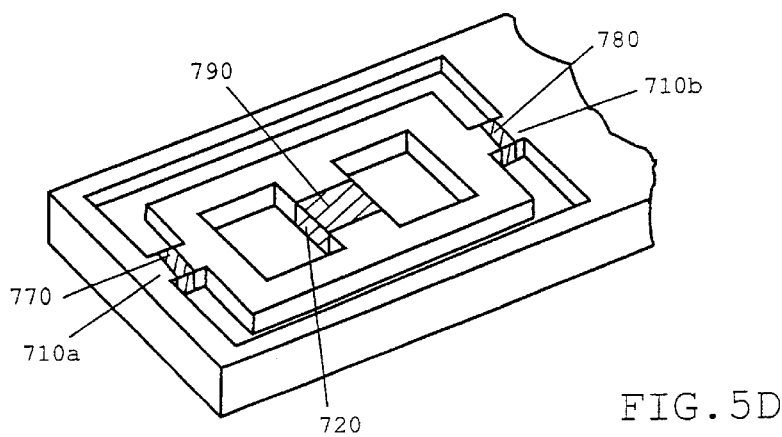

FIG. 5d shows a suspension system with decoupled axis. Bridges 710a, 710b and 720 or parts 770,780,790 of the bridges are comprised by a material or alternatively a layer deposited on the surface of the bridge, where the spring constant strongly varies with a physical property of the material.

While the invention has been shown or described in only some of its forms, it should be apparent to those skilled in the art that it is not so limited, but is susceptible to various changes without departing from the scope of the invention.

What is claimed is:

1. A method of controlling the flying height of a read/write head, comprising:
   providing a read/write head mounted on a suspension arm;
   suspending the head above a storage media with a spring force having a spring constant;
   pushing on the head with the spring force against an aerodynamic lift force acting upon the head; and
   varying the spring constant of at least part of the suspension arm to adjust the flying height, a roll, and a pitch of the head.

2. The method of claim 1, further comprising the step of varying the temperature of the suspension arm at least locally with a coil wrapped around at least a portion of the suspension arm.

3. The method of claim 1, further comprising the step of varying a magnetic field applied to at least part of the suspension arm.

4. The method of claim 1, further comprising the step of varying an electric field in at least part of the suspension arm.

5. The method of claim 1, further comprising the step of varying the spring constant of at least part of the suspension arm to adjust a twist of the head.

6. A data storage device, comprising:
   a movable storage medium and a read/write head placed in proximity to the storage medium at a flying height and mounted on a suspension arm for flexibly suspending the head above the storage medium and for pushing on the head with a spring force against an aerodynamic lift force acting upon the head; wherein
   at least part of the suspension arm has a material with a parameter-dependent spring constant; and
   means for controlling the spring constant by said parameter to adjust the flying height, a roll, and a pitch of the head; and wherein
   the parameter is a strength of a magnetic field.

7. The data storage device of claim 6, wherein the means for controlling the spring constant by said parameter adjusts a twist of the head.

8. The data storage device of claim 6 wherein at least a bending part of the suspension arm comprises a bulk material with a parameter-dependent spring constant.

9. The data storage device of claim 6 wherein at least part of the suspension arm comprises a layer of a material with a parameter-dependent spring constant.

10. The data storage device of claim 5 wherein the spring constant of the material is characterized by an in-homogeneous distribution.

11. The data storage device of claim 5 wherein the spring constant of the material is characterized by an elevated sensitivity that aligns longitudinally or laterally relative to an axis of the suspension arm.

12. A suspension system for a data storage device, comprising:
   a movable storage medium;
   a read/write head placed in proximity to the storage medium at a flying height, wherein the head is mounted on a suspension arm for flexibly suspending the head above the storage medium, such that the suspension arm pushes the head with a spring force against an aerodynamic lift force acting upon the head; wherein
   at least part of the suspension arm comprises a material with a parameter-dependent spring constant;
   magnetic means for acting upon the material with the parameter to adjust the flying height, a roll, a pitch, and a twist of the head by a stretch of a magnetic field; and wherein
   the material with a parameter-dependent spring constant forms a layer in the suspension arm.

* * * * *

UNITED STATES PATENT AND TRADEMARK OFFICE
CERTIFICATE OF CORRECTION

PATENT NO. : 6,707,646 B2
DATED : March 16, 2004
INVENTOR(S) : Berger et al.

It is certified that error appears in the above-identified patent and that said Letters Patent is hereby corrected as shown below:

Column 8,
Line 33, please insert the word -- also -- between the words "parameter" and "adjusts".

Signed and Sealed this

Tenth Day of August, 2004

JON W. DUDAS
*Acting Director of the United States Patent and Trademark Office*